United States Patent
Hirano et al.

(10) Patent No.: US 11,898,811 B2
(45) Date of Patent: Feb. 13, 2024

(54) HEAT EXCHANGER

(71) Applicant: DENSO CORPORATION, Kariya (JP)

(72) Inventors: Akira Hirano, Kariya (JP); Taichi Asano, Kariya (JP)

(73) Assignee: DENSO CORPORATION, Kariya (JP)

( * ) Notice: Subject to any disclaimer, the term of this patent is extended or adjusted under 35 U.S.C. 154(b) by 262 days.

(21) Appl. No.: 17/340,895

(22) Filed: Jun. 7, 2021

(65) Prior Publication Data

US 2021/0293493 A1    Sep. 23, 2021

Related U.S. Application Data

(63) Continuation of application No. PCT/JP2019/047486, filed on Dec. 4, 2019.

(30) Foreign Application Priority Data

Dec. 27, 2018 (JP) .................................. 2018-245068

(51) Int. Cl.
*F28F 9/02* (2006.01)
*F28D 9/00* (2006.01)

(52) U.S. Cl.
CPC .......... *F28F 9/0226* (2013.01); *F28D 9/0093* (2013.01); *F28F 2230/00* (2013.01); *F28F 2275/12* (2013.01)

(58) Field of Classification Search
CPC .. F28F 9/0226; F28F 2230/00; F28F 2275/12; F28F 2275/122; F28F 2225/08; F28D 9/0093
See application file for complete search history.

(56) References Cited

U.S. PATENT DOCUMENTS

| | | | | |
|---|---|---|---|---|
| 4,331,201 A | * | 5/1982 | Hesse | B23P 11/00 165/149 |
| 5,311,933 A | * | 5/1994 | Lee | F28F 9/0226 165/149 |
| 2015/0159963 A1 | * | 6/2015 | Ghiani | F28F 9/0209 165/181 |
| 2016/0370131 A1 | * | 12/2016 | Hermida Domínguez | F28F 1/34 |
| 2017/0191764 A1 | * | 7/2017 | Hruza | F28F 9/0226 |
| 2019/0120124 A1 | | 4/2019 | Suzuki et al. | |

FOREIGN PATENT DOCUMENTS

| | | | |
|---|---|---|---|
| CN | 201794727 U | 4/2011 | |
| JP | 2005317323 A | 11/2005 | |
| JP | 2017015351 A | * 1/2017 | ............ F28F 9/0226 |
| JP | 2017-194211 A | 10/2017 | |

* cited by examiner

*Primary Examiner* — Tho V Duong
(74) *Attorney, Agent, or Firm* — Harness, Dickey & Pierce, P.L.C.

(57) ABSTRACT

A heat exchanger includes: a heat exchange core portion; and a tank portion connected to the heat exchange core portion. The heat exchange core portion has a connection plate that surrounds a part of the tank portion from an outer peripheral side. The connection plate has slit-shaped openings arranged along an edge of the connection plate in a first direction. A part of the connection plate between each of the openings and the edge is deformable into a concave shape toward the tank portion. A part of the openings has a widened portion at both ends in the first direction. A width dimension of the widened portion in a second direction from the opening to the edge is larger than that of the other portion of the opening.

4 Claims, 7 Drawing Sheets

HEAT EXCHANGER

CROSS REFERENCE TO RELATED APPLICATIONS

The present application is a continuation application of International Patent Application No. PCT/JP2019/047486 filed on Dec. 4, 2019, which designated the U.S. and claims the benefit of priority from Japanese Patent Application No. 2018-245068 filed on Dec. 27, 2018. The entire disclosures of all of the above applications are incorporated herein by reference.

TECHNICAL FIELD

The present disclosure relates to a heat exchanger.

BACKGROUND

A vehicle is provided with heat exchangers, such as a radiator, an intercooler and a heater core, for exchanging heat between fluids.

SUMMARY

According to an aspect of the present disclosure, a heat exchanger includes: a heat exchange core portion in which heat is exchanged between a first fluid and a second fluid; and a tank portion connected to the heat exchange core portion to supply the first fluid to the heat exchange core portion or discharge the first fluid from the heat exchange core portion. The heat exchange core portion has a connection plate that surrounds a part of the tank portion from an outer peripheral side. The connection plate has slit-shaped openings arranged along an edge of the connection plate in a first direction. A part of the connection plate between each of the openings and the edge is deformable into a concave shape toward the tank portion such that the heat exchange core portion is fixed to the tank portion. At least a part of the openings has a widened portion at both ends in the first direction. A width dimension of the widened portion in a second direction from the opening to the edge is larger than that of the other portion of the opening.

DESCRIPTION OF EMBODIMENT

Figure 1:
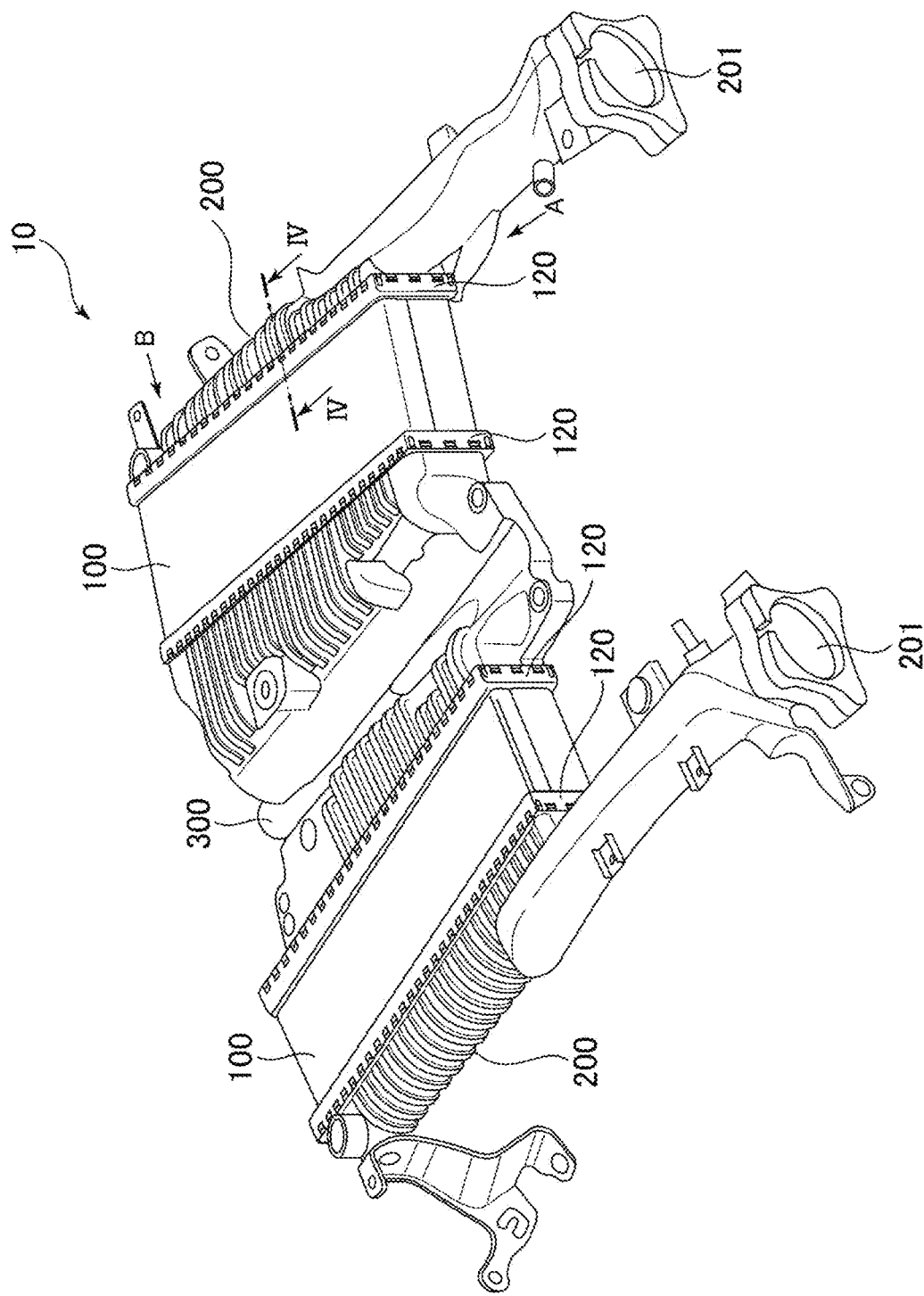
FIG. 1 is a view showing a heat exchanger according to a first embodiment.

A vehicle is provided with heat exchangers for exchanging heat between fluids. For example, a radiator releases heat from cooling water, and an intercooler reduces the temperature of air supercharged to an internal combustion engine. A heater core is used for air-conditioning.

A heat exchanger includes a heat exchange core portion for exchanging heat between fluids, and a tank portion connected to the heat exchange core portion for supplying or discharging one of the fluids to the heat exchange core portion. For example, in the heat exchanger, a connection plate is provided in the heat exchange core portion, and the heat exchange core portion and the tank portion are connected to each other via the connection plate.

The connection plate surrounds a part of the tank portion from the outer peripheral side. The connection plate has slit-shaped openings arranged along the edge of the connection plate. A portion of the connection plate between each opening and the edge is deformed in a concave shape toward the tank portion by crimping. As a result, the connection plate is fixed to the tank portion together with the heat exchange core portion.

While the vehicle is travelling, vibration is applied to the connection between the heat exchange core portion and the tank portion. In addition, the pressure of fluid flowing inside may be applied to the connection. For this reason, relatively large stress concentration is generated in a portion of the connection plate where the opening is formed, and the connection plate may be damaged by the stress concentration. If the connection plate is damaged, fluid may leak outside from the damaged part, and the vehicle may not be able to travel.

The present disclosure provides a heat exchanger in which a damage to the connection plate can be restricted.

According to an aspect of the present disclosure, a heat exchanger includes: a heat exchange core portion in which heat is exchanged between a first fluid and a second fluid; and a tank portion connected to the heat exchange core portion to supply the first fluid to the heat exchange core portion or discharge the first fluid from the heat exchange core portion. The heat exchange core portion has a connection plate that surrounds a part of the tank portion from an outer peripheral side. The connection plate has slit-shaped openings arranged along an edge of the connection plate in a first direction. A part of the connection plate between each of the openings and the edge is deformable into a concave shape toward the tank portion such that the heat exchange core portion is fixed to the tank portion. At least a part of the openings has a widened portion at both ends in the first direction. A width dimension of the widened portion in a second direction from the opening to the edge is larger than that of the other portion of the opening.

In the heat exchanger, the widened portion is formed in at least a part of the openings in the connection plate. The widened portion is formed at both ends of the opening in the first direction. The widened portion is larger in width dimension in the second direction than the other portion of the opening. That is, in the opening, the width dimension of the widened portion at the both ends is larger than the width dimension at the center portion.

In such a configuration, the stress is most likely to occur at the winded portion of the connection plate where the width dimension is large. Therefore, the shape of the opening restricts the stress from being concentrated in a narrow range of the connection plate. As a result, it is possible to restrict the connection plate from being damaged due to the stress concentration.

According to the present disclosure, there is provided a heat exchanger capable of restricting damage to the connection plate.

Hereinafter, the present embodiment will be described with reference to the attached drawings. In order to facilitate the ease of understanding, the same reference numerals are attached to the same constituent elements in each drawing where possible, and redundant explanations are omitted.

A first embodiment is described. FIG. 1 shows the overall configuration of the heat exchanger 10 according to the present embodiment. The heat exchanger is mounted on a vehicle (not shown), and is configured as a so-called intercooler for pre-cooling air that has passed through the supercharger of the vehicle before supplying it to the internal combustion engine. In the heat exchanger 10, heat is exchanged between the air and the cooling water, whereby the air is cooled. The heat exchanger 10 includes a heat exchange core portion 100, an inlet tank portion 200, and an outlet tank portion 300.

The heat exchange core portion 100 exchanges heat between air and cooling water. The heat exchange core portion 100 is made of metal, specifically aluminum. As shown in FIG. 1, the heat exchange core portion 100 has a substantially rectangular parallelepiped shape. Plates (not shown) are stacked with each other inside the heat exchange core portion 100 to partition the flow path for the cooling water. The cooling water is supplied from a supply port (not shown) to the heat exchange core portion 100, and is heated by the air passing outside the flow path while flowing through the flow path between the plates. After that, the cooling water is discharged to the outside from a discharge port (not shown) provided in the heat exchange core portion 100. The high-temperature air supplied from the inlet tank portion 200 to the heat exchange core portion 100 is cooled by the cooling water flowing through the flow path, and then discharged to the outlet tank portion 300 to be supplied to an internal combustion engine (not shown).

In this way, in the heat exchange core portion 100, heat is exchanged between the air which is a first fluid and the cooling water which is a second fluid. In implementing the structural device of the heat exchanger 10 to be described later, fluids different from the above may be used as the first fluid and the second fluid, respectively.

The inlet tank portion 200 supplies air to the heat exchange core portion 100. The inlet tank portion 200 is made of resin. Alternatively, the inlet tank portion 200 may be made of metal in the same manner as the heat exchange core portion 100. The inlet tank portion 200 is connected to one end of the heat exchange core portion 100. The connection structure will be described later. The inlet tank portion 200 has an inlet portion 201 which is an opening for receiving air that has passed through a supercharger (not shown).

The outlet tank portion 300 receives the air, after the heat exchange, from the heat exchange core portion 100 and guides the air to the internal combustion engine. The outlet tank portion 300 corresponds to a "tank portion" together with the inlet tank portion 200 in the present embodiment. The outlet tank portion 300 is made of metal. The outlet tank portion 300 is connected to the other end of the heat exchange core portion 100 opposite to the inlet tank portion 200. The connection structure is the same as the connection structure (described later) between the inlet tank portion 200 and the heat exchange core portion 100. The lower surface portion of the outlet tank portion 300 is connected to the internal combustion engine.

The vehicle on which the heat exchanger 10 is mounted is provided with two turbochargers. In line with this, the heat exchanger 10 is provided with two heat exchange core portions 100 and two inlet tank portions 200, as shown in FIG. 1. The air that has passed through the heat exchange core portions 100 is supplied to the internal combustion engine after merging at the outlet tank portion 300. In the heat exchanger 10, the structures of the heat exchange core portion 100 and the inlet tank portion 200 on one side and the structures of the heat exchange core portion 100 and the inlet tank portion 200 on the other side are symmetrical with each other.

The structure where the inlet tank portion 200 and the heat exchange core portion 100 are connected to each other will be described with reference to FIGS. 2 to 4. Since the structure where the outlet tank portion 300 and the heat exchange core portion 100 are connected to each other is the same as the structure described below, the description thereof will be omitted.

Figure 2:
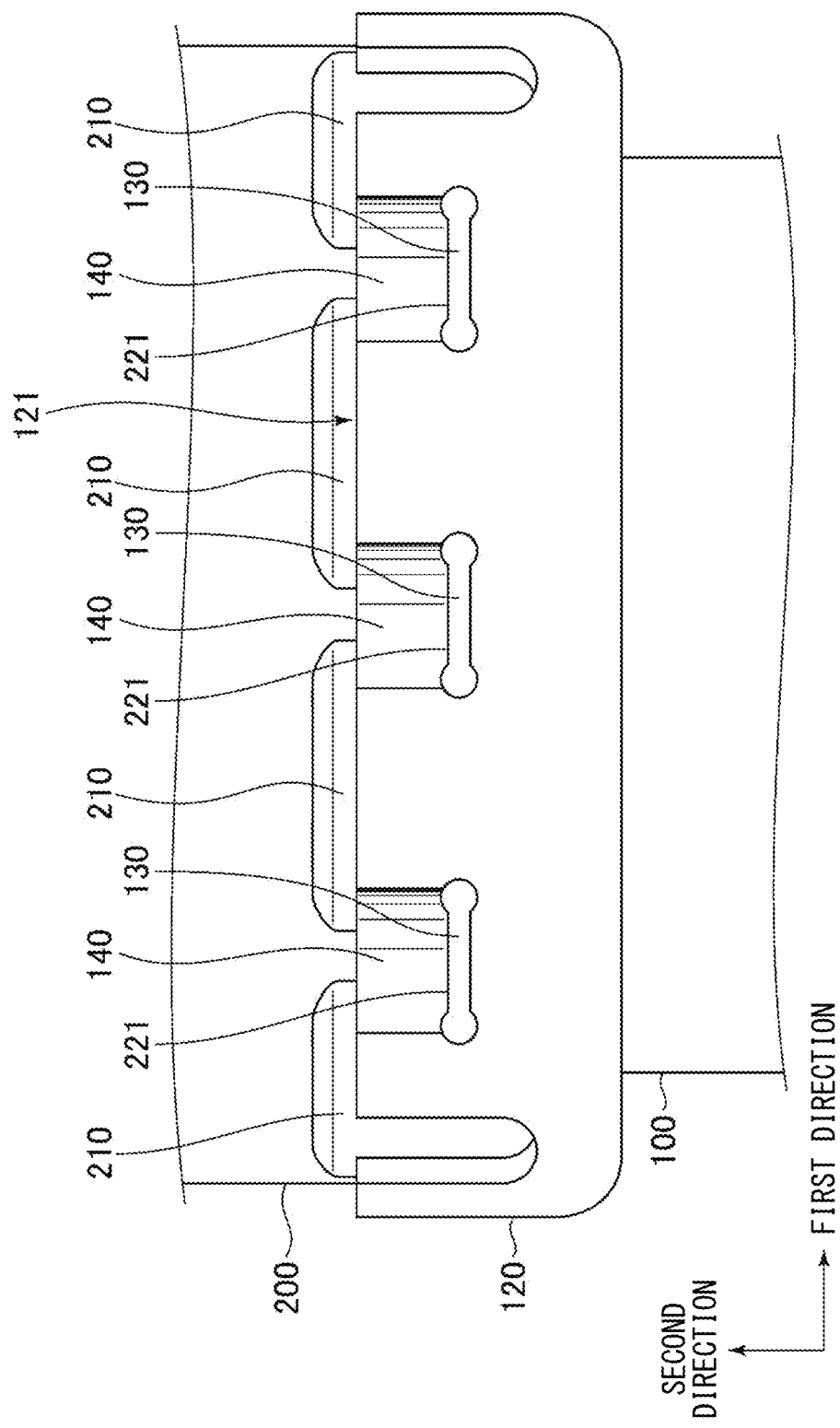
FIG. 2 is an enlarged view illustrating the heat exchanger of FIG. 1.
Figure 3:
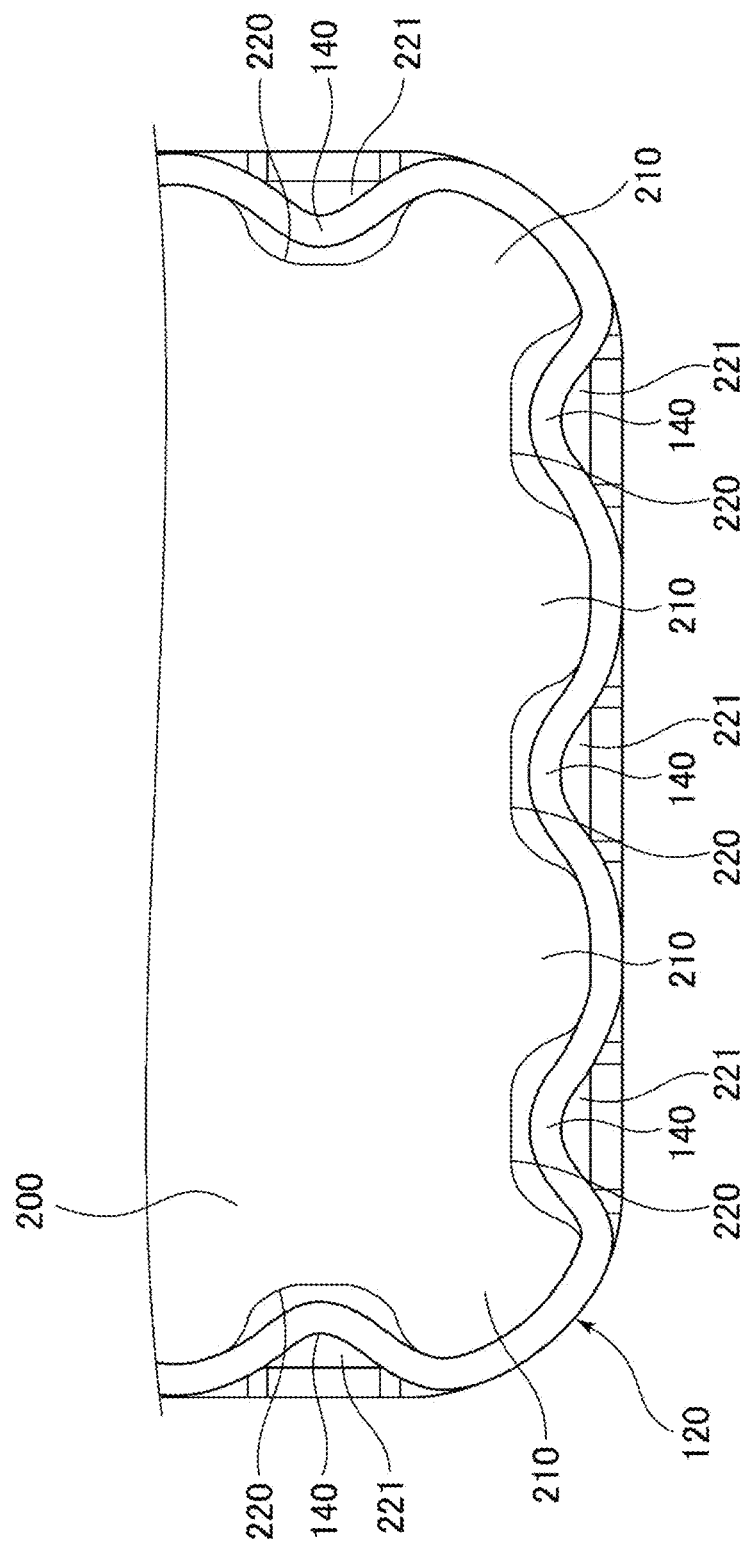
FIG. 3 is an enlarged view illustrating the heat exchanger of FIG. 1.

FIG. 2 is an enlarged view showing a part of the heat exchanger 10 viewed along the arrow A in FIG. 1. FIG. 3 is an enlarged view showing a part of the heat exchanger 10 viewed along the arrow B in FIG. 1. FIG. 4 is a schematic cross-sectional view taken along a line IV-IV of FIG. 1.

Figure 4:
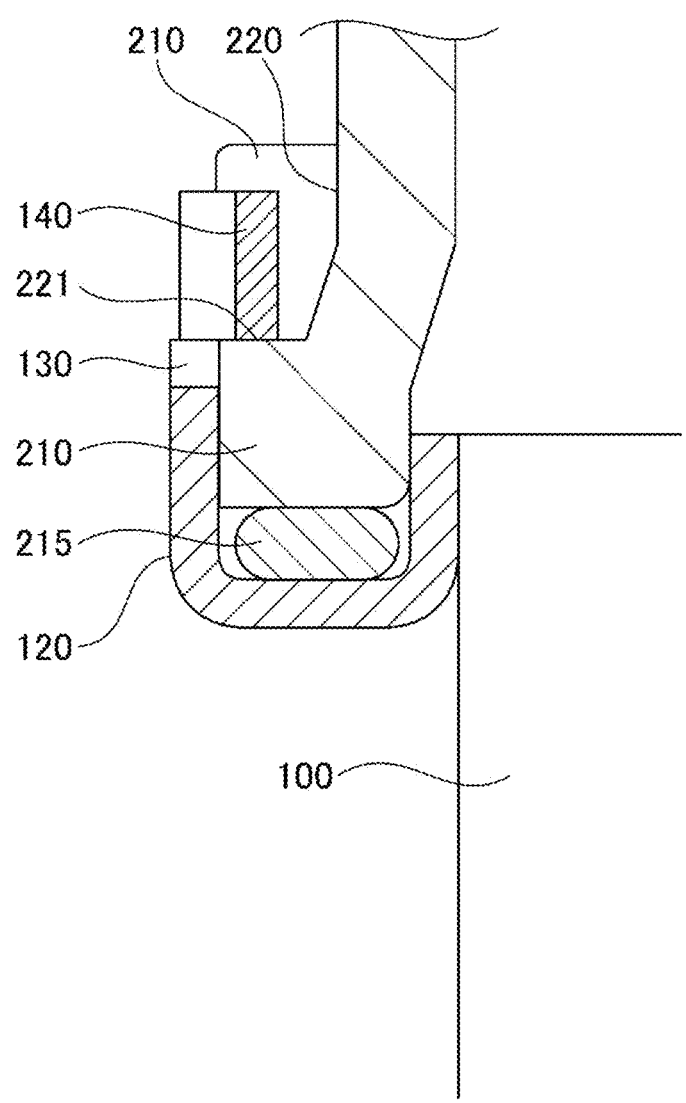
FIG. 4 is a schematic cross-sectional view taken along a line IV-IV in FIG.

As shown in FIGS. 2 and 4, the heat exchange core portion 100 is provided with a connection plate 120. The connection plate 120 is projected from the heat exchange core portion 100 toward the inlet tank portion 200 in the direction in which the heat exchange core portion 100 and the inlet tank portion 200 are arranged in FIG. 1.

The connection plate 120 is provided to cover the entire circumference of the end portion of the heat exchange core portion 100. An end portion of the inlet tank portion 200 adjacent to the heat exchange core portion 100 is inserted inside the connection plate 120. In other words, a part of the inlet tank portion 200 is surrounded by the connection plate 120 from the outer peripheral side.

An edge portion of the connection plate 120 opposite to the heat exchange core portion 100, as shown in FIG. 2, is also referred to as "edge 121" below. The connection plate 120 has openings 130 arranged along the edge 121. The opening 130 has a slit shape, and the longitudinal direction of the slit shape is along the arrangement direction of the openings 130. A direction in which the openings 130 are lined up is also referred to as a "first direction" below. Further, a direction perpendicular to the first direction, from the opening 130 toward the edge 121, is referred to as a "second direction" below.

A part of the connection plate 120 between each opening 130 and the edge 121 is deformed in a concave shape toward the inlet tank portion 200 (in FIG. 2, recessed to the back side of the paper surface). As shown in FIG. 3, in a part of the inlet tank portion 200 surrounded by the connection plate 120, a concave portion 220 and a convex portion 210 are alternately arranged. The concave portion 220 has a concave shape recessed in a direction away from the connection plate 120. The other portion other than the concave portion 220 is the convex portion 210.

The position of the concave portion 220 formed in the inlet tank portion 200 overlaps with a part of the connection plate 120 between the opening 130 and the edge 121. Therefore, when a crimping force is applied between the opening 130 and the edge 121 of the connection plate 120, the connection plate 120 is deformed and enters the concave portion 220. When the deformed portion comes into contact with a bottom portion 221 of the concave portion 220, the connection plate 120 is connected to and fixed to the inlet tank portion 200. In this way, when the part of the connection plate 120 between each opening 130 and the edge 121 is deformed in a concave shape toward the inlet tank portion 200 or the outlet tank portion 300, the heat exchange core portion 100 is fixed to the inlet tank portion 200 or the outlet tank portion 300.

As shown in FIG. 4, a sealing material 215 is arranged between the connection plate 120 and the inlet tank portion 200. The sealing material 215 is, for example, a packing made of rubber. Since the sealing material 215 closes the space between the connection plate 120 and the inlet tank portion 200 in a watertight manner, it is possible to restrict the cooling water from leaking outside from the space.

While the vehicle is travelling, vibration is applied to the connection between the heat exchange core portion 100 and the inlet tank portion 200. Further, the pressure of the cooling water flowing inside may be applied to the connection. Therefore, a relatively large stress concentration may occur in a part of the connection plate 120 where the opening 130 is formed, and the connection plate 120 may be damaged. If the connection plate 120 is damaged, the cooling water may leak outside from the damaged portion, and the vehicle may not be able to travel.

In the heat exchanger 10 according to the present embodiment, the stress concentration due to vibration or the like is suppressed by devising the shape of the opening 130, and the connection plate 120 is restricted from being damaged. The shape of the opening 130 will be described with reference to FIG. 5.

The opening 130 has a slit shape as described above, but its width dimension is not uniform throughout the opening 130. The width dimension is larger in a part of the opening 130 than in the other parts. The "width dimension" referred to here is a dimension of the opening 130 in the second direction.

Figure 5:
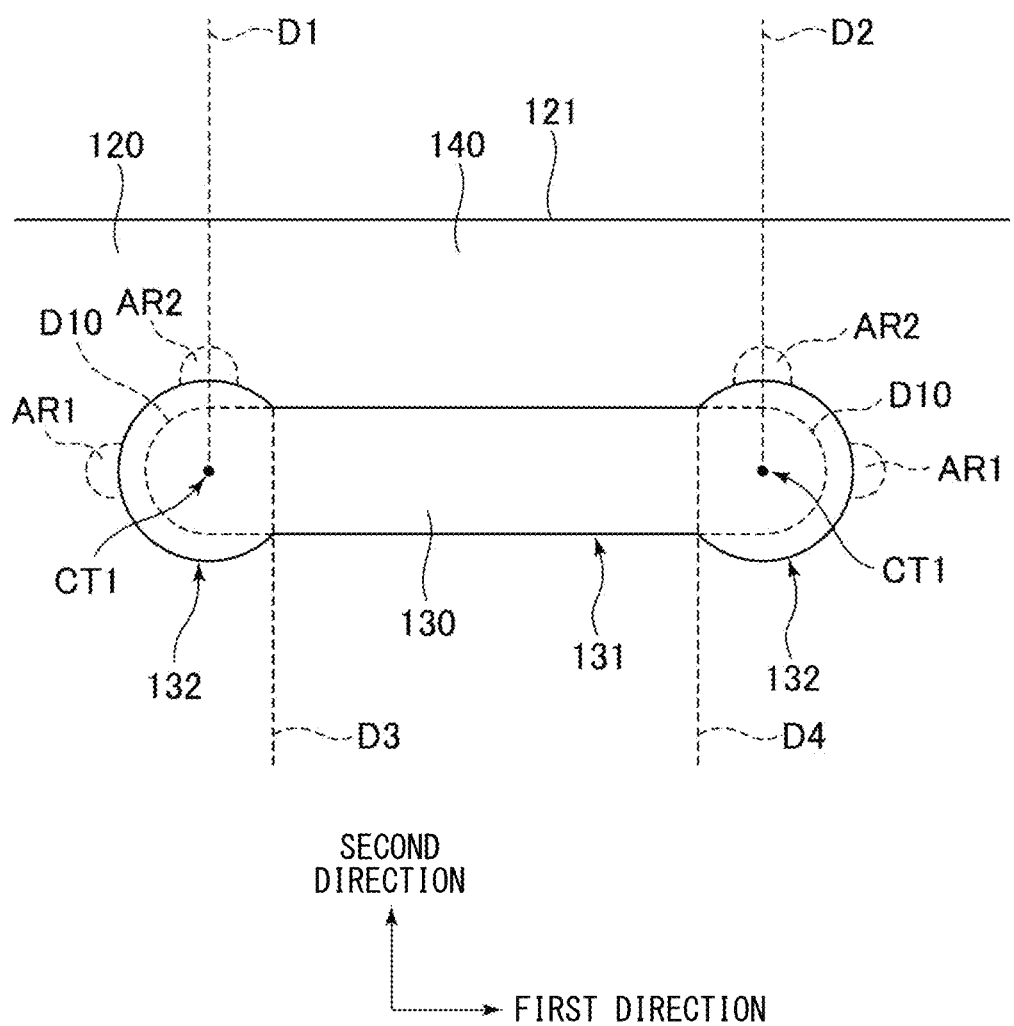
FIG. 5 is a view showing a shape of an opening formed in a connection plate according to the first embodiment.

As shown in FIG. 5, the width dimension is larger at both ends of the opening 130 in the first direction than at the other portions. A portion of the opening 130 having such a large width dimension is also referred to as "widened portion 132" below. Further, in the "other portion" having a width dimension smaller than that of the widened portion 132, the edges of the opening 130 are parallel to each other. Therefore, this portion will be referred to as "parallel portion 131" below.

In FIG. 5, the boundary between the parallel portion 131 and the widened portion 132 on the left side is indicated by the dotted line D3. The boundary between the parallel portion 131 and the widened portion 132 on the right side is indicated by the dotted line D4.

In the present embodiment, each of the widened portions 132 is formed in an arc shape having a single center. The center of the arc shape is indicated by reference numeral CT1 in FIG. 5. Therefore, the widened portion 132 projects from the other portion (that is, the parallel portion 131) of the opening 130 toward the edge 121 and a side opposite from the edge 121 in the second direction.

The dotted lines D1 and D2 shown in FIG. 5 indicate the boundary between the convex portion 210 and the concave portion 220 of the inlet tank portion 200 (not shown in FIG. 5) on the back side of the paper surface. The concave portion 220 is formed in an area between the dotted line D1 and the dotted line D2. Therefore, the connection plate 120 between the opening 130 and the edge 121 and between the dotted line D1 and the dotted line D2 is deformable into a concave shape toward the inlet tank portion 200 (to the back side of the paper surface in FIG. 5) by crimping. The area of the connection plate 120 that is deformed in this way is also referred to as "deformation range 140" below.

Stress concentration due to vibration or the like is likely to occur in the edge portion of the opening 130 of the connection plate 120. Specifically, the stress concentration is likely to occur in a portion of the slit-shaped opening 130 near the end in the longitudinal direction. In FIG. 5, the region where the stress concentration is likely to occur is indicated by the dotted line AR1.

In the present embodiment, stress is most likely to occur at the widened portion 132 of the connection plate 120 where the width dimension is made large. Compared with a case where the widened portion 132 is not formed, for example, represented by the shape shown by the dotted line D10 in FIG. 5, the radius of curvature of the portion where stress is likely to occur is made larger. As a result, stress is restricted from being concentrated in a narrow range of the connection plate 120, and the connection plate 120 is restricted from being damaged due to stress concentration.

As described above, in the present embodiment, the shape of the opening 130 formed in the connection plate 120 is devised. Specifically, the opening 130 has the widened portion 132 that is larger in the width dimension along the second direction than the other portion (that is, the parallel portion 131) of the opening 130. The widened portion 132 is formed at both ends of the opening 130 in the first direction, so as to restrict damage to the connection plate 120 due to stress concentration. The widened portion 132 may be formed in all the openings 130 as in the present embodiment, but may be formed only in some of the openings 130.

In the present embodiment, the widened portion 132 is formed in the shape of one arc as a whole, but the shape of the widened portion 132 may be different from this. For example, the widened portion 132 may be formed so that the shape of the edge of the opening 130 is a combination of a straight line and a curved line.

As described above, the deformation range 140 of the connection plate 120 is located between the dotted line D1 and the dotted line D2 in FIG. 5. In the present embodiment, the widened portion 132 extends along the first direction to a position outside the deformation range 140.

When the deformation range 140 is deformed by crimping, a stress is generated in the connection plate 120 due to the deformation. The stress is easily generated in the portion of the connection plate 120 in contact with the boundary between the convex portion 210 and the concave portion 220. That is, stress is likely to occur in a portion overlapping the dotted line D1 or the dotted line D2, such as the region shown by the dotted line AR2 in FIG. 5. It should be noted that the "boundary between the convex portion 210 and the concave portion 220" can be said to be a corner of the convex portion 210.

If the region indicated by the dotted line AR2 and the region indicated by the dotted line AR1 overlap each other, the stress due to crimping and the stress due to vibration or the like occur at the same area. In this case, the stress concentration occurs in the superposed manner.

Therefore, in the present embodiment, the opening 130 is formed so that the widened portion 132 of the opening 130 corresponding to the deformation range 140 extends to a position outside the deformation range 140 in the first direction. As a result, the superposed-manner stress concentration can be prevented since the region indicated by the dotted line AR2 and the region indicated by the dotted line AR1 do not overlap each other.

Figure 6:
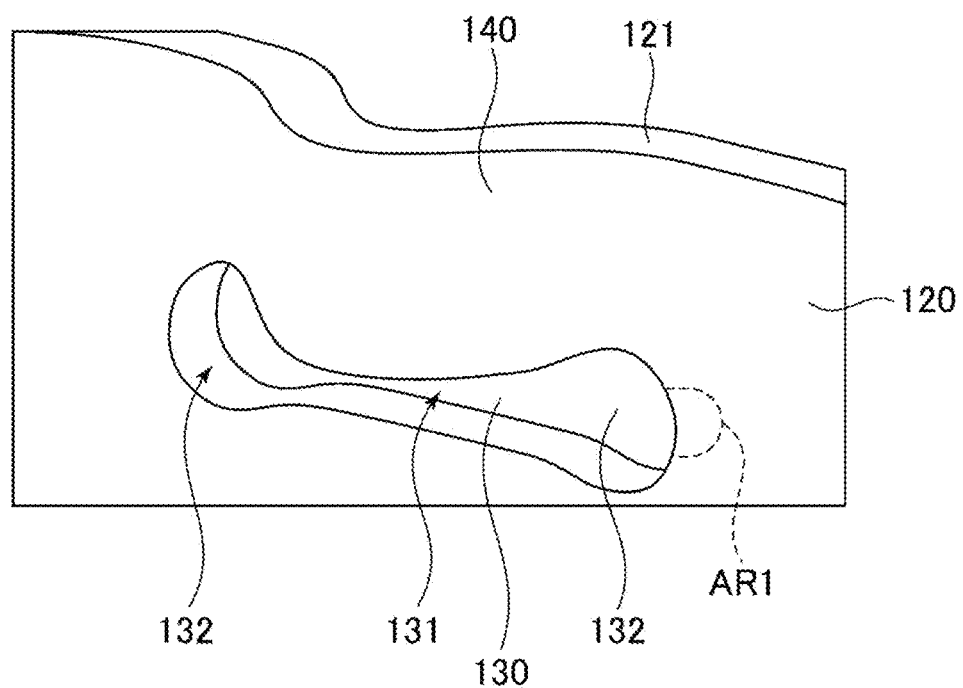
FIG. 6 is a view showing a shape of the connection plate according to the first embodiment.

FIG. 6 shows the shape of the connection plate 120 in a state where the deformation range 140 is deformed by crimping. According to the analysis by the present inventors, it is confirmed that the largest stress concentration occurs in the region indicated by the dotted line AR1 due to vibration during traveling and the like. However, it is also confirmed that the maximum value of the generated stress is reduced by about 14% as compared with a case where the widened portion 132 is not formed as shown by the dotted line D10 in FIG. 5.

Figure 7:
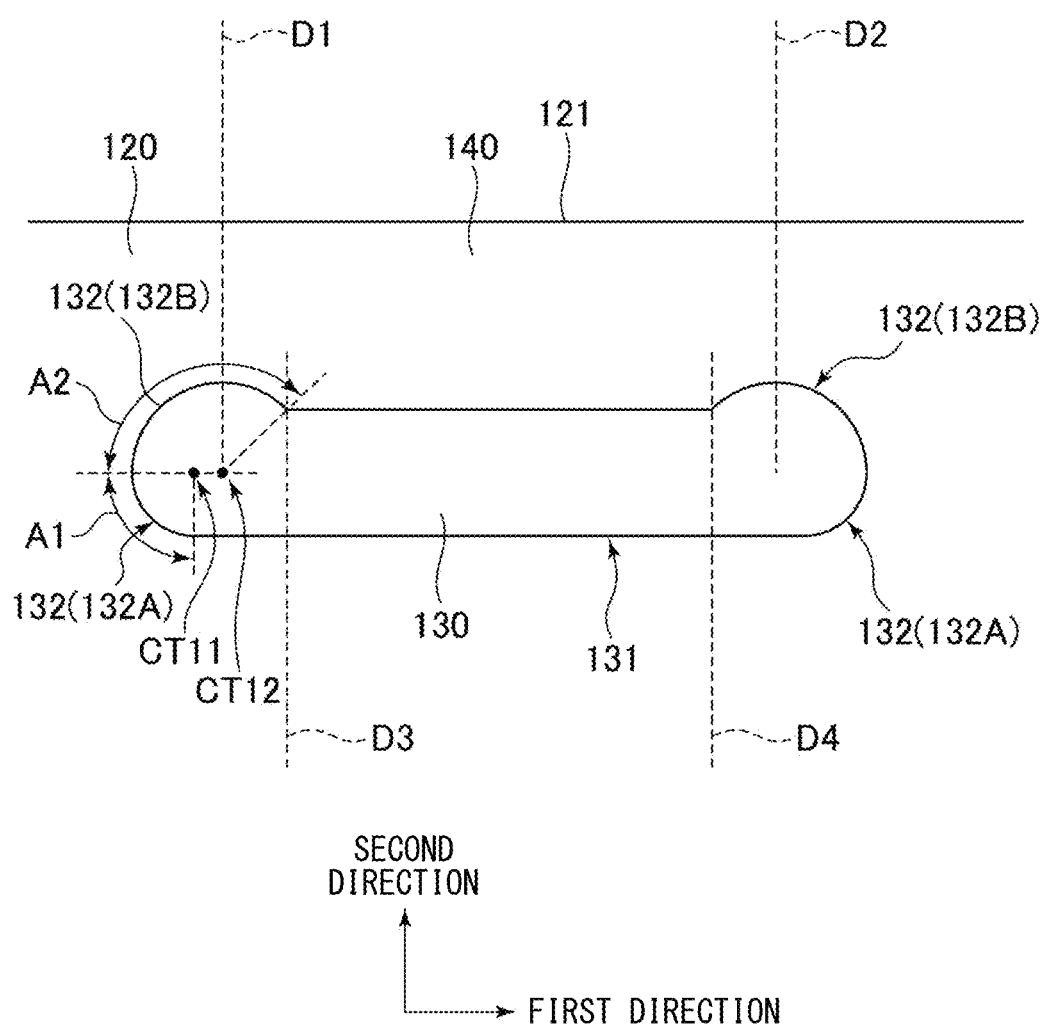
FIG. 7 is a view showing a shape of an opening formed in a connection plate according to a second embodiment.

A second embodiment will be described with reference to FIG. 7. The present embodiment differs from the first embodiment only in the shape of the opening 130, specifically, in the shape of the widened portion 132. Hereinafter, only parts different from the first embodiment will be described, and description of parts common to the first embodiment will be omitted.

The widened portion 132 in the present embodiment is also formed in an arc shape, but is not formed in a single arc shape as in the first embodiment. The widened portion 132 according to the present embodiment has a first arc portion 132A formed in an arc shape and a second arc portion 132B formed in an arc shape having a center different from that of the first arc portion 132A. In FIG. 7, the center of the first arc portion 132A is indicated by the reference numeral CT11, and the center of the second arc portion 132B is indicated by the reference numeral CT12.

The first arc-shaped portion 132A is formed so as to surround the center indicated by the reference numeral CT11 in a range of 90 degrees from the end portion of the parallel portion 131 farther from the edge 121. In FIG. 7, the range of the first arc portion 132A is indicated by the arrow A1.

The second arc-shaped portion 132B is formed so as to surround the center indicated by the reference numeral CT12 in a range of 120 degrees from the end portion of the parallel portion 131 closer to the edge 121. In FIG. 7, the range of the second arc portion 132B is indicated by the arrow A2.

As a result of forming the shape as described above, the widened portion 132 in the present embodiment protrudes toward the edge 121 in the second direction from the other portion (that is, the parallel portion 131) of the opening 130. However, the widened portion 132 does not protrude to the opposite side. Even when the widened portion 132 has such a shape, the same effect as that described in the first embodiment can be obtained.

The present embodiments have been described above with reference to concrete examples. However, the present disclosure is not limited to those specific examples. Those specific examples that are appropriately modified in design by those skilled in the art are also encompassed in the scope of the present disclosure, as far as the modified specific examples have the features of the present disclosure. Each element included in each of the specific examples described above and the arrangement, condition, shape, and the like thereof are not limited to those illustrated, and can be changed as appropriate. The combinations of elements included in each of the above described specific examples can be appropriately modified as long as no technical inconsistency occurs.

What is claimed is:

1. A heat exchanger comprising:
a heat exchange core portion in which heat is exchanged between a first fluid and a second fluid; and
a tank portion connected to the heat exchange core portion to supply the first fluid to the heat exchange core portion or discharge the first fluid from the heat exchange core portion, wherein
the heat exchange core portion has a connection plate that surrounds a part of the tank portion from an outer peripheral side,
the connection plate has a plurality of slit-shaped openings arranged along an edge of the connection plate in a first direction, a direction from the opening to the edge being defined as a second direction,
a part of the connection plate between each of the openings and the edge is deformable into a concave shape toward the tank portion such that the heat exchange core portion is fixed to the tank portion,
at least a part of the openings has a widened portion at both ends in the first direction,
a width dimension of the widened portion in the second direction is larger than that of the other portion of the opening, and
the widened portion projects from the other portion of the opening toward the edge and a side opposite from the edge in the second direction.

2. The heat exchanger according to claim 1, wherein the widened portion is formed in an arc shape.

3. The heat exchanger according to claim 1, wherein
the part of the connection plate between the opening and the edge that is deformable into the concave shape toward the tank portion is defined as a deformation range of the connection plate, and
the widened portion of the opening corresponding to the deformation range extends to a position outside the deformation range in the first direction.

4. A heat exchanger comprising:
a heat exchange core portion in which heat is exchanged between a first fluid and a second fluid; and
a tank portion connected to the heat exchange core portion to supply the first fluid to the heat exchange core portion or discharge the first fluid from the heat exchange core portion, wherein
the heat exchange core portion has a connection plate that surrounds a part of the tank portion from an outer peripheral side,
the connection plate has a plurality of slit-shaped openings arranged along an edge of the connection plate in a first direction, a direction from the opening to the edge being defined as a second direction,
a part of the connection plate between each of the openings and the edge is deformable into a concave shape toward the tank portion such that the heat exchange core portion is fixed to the tank portion,
at least a part of the openings has a widened portion at both ends in the first direction,
a width dimension of the widened portion in the second direction is larger than that of the other portion of the opening, and
the widened portion has a first arc portion formed in an arc shape and a second arc portion formed in an arc shape to have a center different from that of the first arc portion.

* * * * *